United States Patent [19]

Stahlhuth

[11] 4,350,236

[45] Sep. 21, 1982

[54] ELECTROMAGNETIC CLUTCH ASSEMBLY

[75] Inventor: Paul H. Stahlhuth, Mission Viejo, Calif.

[73] Assignee: Ford Aerospace & Communications Corp., Detroit, Mich.

[21] Appl. No.: 214,363

[22] Filed: Dec. 8, 1980

[51] Int. Cl.³ .................. F16D 27/10; F02C 7/268
[52] U.S. Cl. .................. 192/84 C; 60/39.14 M; 74/7 C; 290/38 A; 290/48
[58] Field of Search .................. 192/84 A, 84 C; 60/39.14 M; 290/38 A, 48; 74/7 C

[56] References Cited

U.S. PATENT DOCUMENTS

| | | | |
|---|---|---|---|
| 1,246,691 | 11/1917 | Wilson | 290/38 A |
| 2,046,910 | 7/1936 | Barrett | 192/84 C |
| 2,666,509 | 1/1954 | Jaggi | 192/84 C |
| 2,946,418 | 7/1960 | Leeson, Jr. | 192/84 C X |
| 3,451,516 | 6/1969 | Watson | 192/84 |
| 3,458,022 | 7/1969 | Reiff | 192/84 |
| 3,674,122 | 7/1972 | Buisker | 192/113 |
| 3,863,743 | 2/1975 | Rule | 192/84 |
| 3,912,060 | 10/1975 | Handke | 192/113 |
| 3,978,953 | 9/1976 | Miller | 192/84 |
| 4,187,939 | 2/1980 | Silvestrini et al. | 192/84 |
| 4,194,610 | 3/1980 | Miller | 192/111 |

Primary Examiner—Allan D. Hermann
Attorney, Agent, or Firm—Paul K. Godwin, Jr.; Robert D. Sanborn

[57] ABSTRACT

A clutch assembly for use in a high speed starter motor/turbine assembly wherein the elements thereof must be extremely well balanced. Opposing clutch elements are unitary rigid structures without moving parts. The starter motor rotor and one of the clutch elements are assembled as a unitary balanced structure for high speed rotation and axial movement to engage or disengage the other clutch element and its associated balanced turbine load.

6 Claims, 1 Drawing Figure

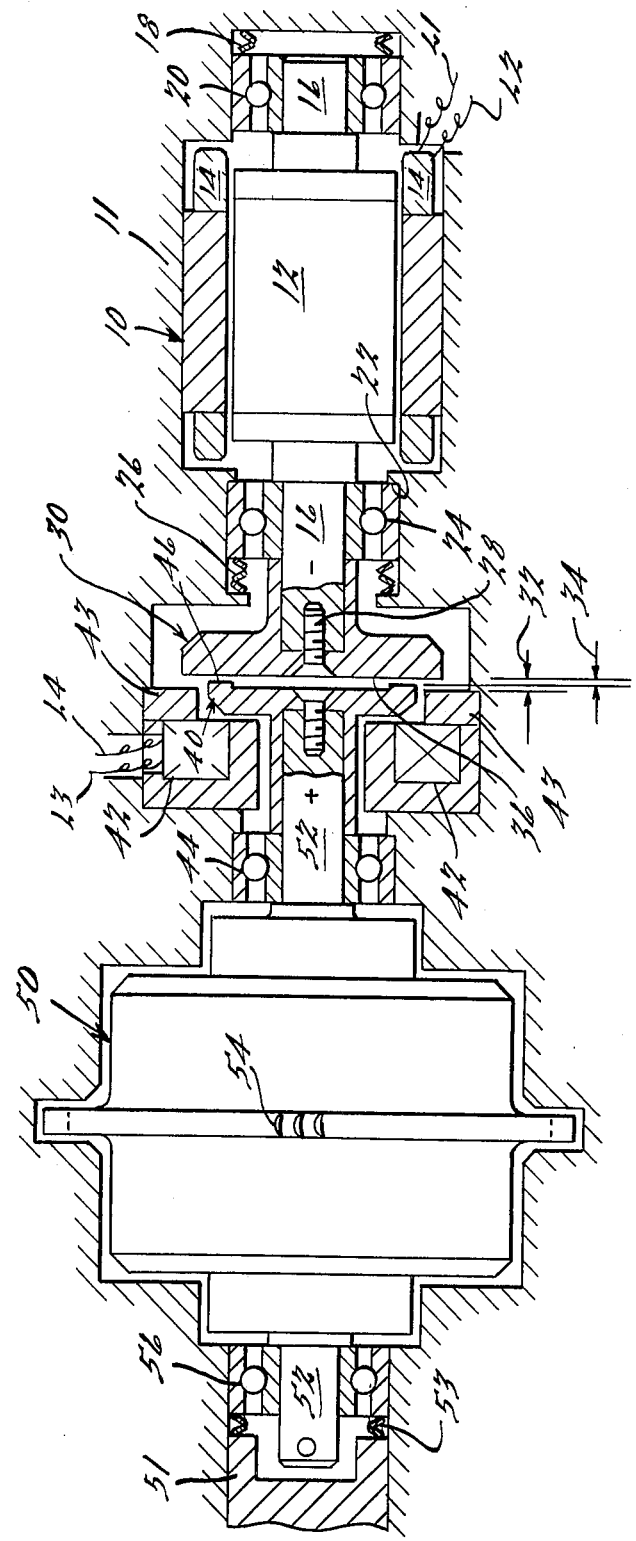

ELECTROMAGNETIC CLUTCH ASSEMBLY

BACKGROUND OF THE INVENTION

1. Field of the Invention

The present invention is directed to the field of electromagnetic clutch assemblies and improvements thereof.

2. Description of the Prior Art

Conventional electromagnetic clutch assemblies often utilize opposing clutch surfaces which are mounted for coaxial rotation and electromagnetic control of their engagement to communicate rotational driving forces therebetween. Those prior art devices normally include an axially movable armature element, that is attached to an axially retained prime mover (driving force rotor), having elements that are keyed to transmit torque. Those elements are either resilient, slidable or otherwise movably controlled by the electromagnetic field to engage the opposing clutch rotor element.

Clutch assemblies which utilize resilient, slidable or otherwise movable elements within the clutch armature are suitable for low speed communication for rotational driving forces. However, those conventional armatures are difficult to fabricate so as to maintain their concentricity and balance at high speeds due to positional shifting of the movable elements. Of course, any imbalance at the higher speeds will cause vibration and rapid deterioration of the entire prime mover and load assemblies.

SUMMARY OF THE INVENTION

It is an object of the present invention to provide an electromagnetic clutch assembly suitable for high speed rotation and balanced operation.

It is another object of the present invention to provide an electromagnetic clutch assembly in which opposing clutch rotor and armature elements are each unitary structures without moving parts.

It is a further object of the present invention to provide an electromagnetic clutch assembly in which a relatively movable clutch armature structure is rigidly mounted onto the rotating shaft of a prime mover and that rigid structure is mounted for common rotation and axial movement with no loss of concentricity and balance.

The present invention overcomes the problems common to prior art clutch assemblies which prevented their use in high speed applications. The invention is presently embodied in a starter motor/turbine alternator configuration which operates at a speed of approximately 80,000 rpm. Precisely balanced assemblies are required for such high speed operation in order to eliminate vibration and its resulting deterioration of components.

Solid unitary structures are employed as opposing clutch engagement pieces and the structures are rigidly mounted on corresponding prime mover and load elements. An electromagnetic actuator is located adjacent the opposing clutch pieces so as to provide relative axial movement and engagement of the prime mover and its clutch piece with respect to the load clutch piece.

The prime mover, in the preferred embodiment, is a starter motor rotor having a shaft which is mounted for high speed rotation. A clutch piece is rigidly mounted on the shaft of the rotor. The rotor shaft is mounted on bearings having outer races which are free to slide within the motor housing; and is spring biased to assume a normal axial position in the housing wherein the rotor clutch piece is disengaged from the load clutch piece. Upon energization of the electromagnetic actuator, the shaft/rotor/clutch piece assembly and bearings are axially displaced towards the load and the two clutch pieces frictionally engage. Upon deenergization of the electromagnetic actuator, the bias springs axially return the shaft/rotor/clutch piece assembly and bearings to their normal positions and the two clutch pieces are instantaneously disengaged.

BRIEF DESCRIPTION OF THE DRAWING

The FIGURE illustrates a complete cross section of the preferred embodiment of the present invention.

DETAILED DESCRIPTION OF THE PREFERRED EMBODIMENT

The present invention includes a clutch assembly shown in the center of the FIGURE. The clutch assembly includes a clutch armature piece 30 axially aligned for rotation and mounted opposite a clutch rotor piece 40. The clutch armature 30 is a unitary structure having no movable parts thereon but containing an engagement surface 36 which provides a frictional engagement drive to an oppositely facing engagement surface 46 on the clutch rotor 40. The clutch rotor piece 40 is also a unitary structure having no movable parts thereon and is mounted on a shaft 52 which is connected to a turbine rotor assembly load 50. The clutch armature 30 is rigidly connected to a shaft 16 of a starter motor rotor 12 mounted in a starter motor assembly 10.

The motor windings 14 are connected to a conventional supply source (not shown) through lead lines $L_1$ and $L_2$. The bearings 20 and 24 are mounted in the housing 11 so as to be axially movable therein. A bearing preload spring 18, such as a belleville type washer, is adjacent the bearing 20, at the end of the shaft 16, and serves to establish the recommended bearing axial preload to insure proper operation at high rotational speeds and to accommodate axial expansion differences.

Near the clutch end of the rotor shaft 16, the bearing 24 is mounted within the housing 11 so as to have limited sliding allowance therein. A clutch return spring 26 is located at the clutch side of the bearing 24 so as to return bias the rotor 12, shaft 16, and clutch armature 30 to a normal disengaged position along the axis wherein the biasing 24 abutts a bearing stop 22.

A clutch field coil assembly 42 is located adjacent the clutch rotor 40 and the clutch armature 30 and, when energized through lead lines $L_3$ and $L_4$, provides an electromagnetic actuation field through a ferrous stator 43. The field draws the ferrous clutch armature 30 so that its engagement surface 36 contacts and frictionally engages the contact surface 46 of the clutch rotor 40. The electromagnetic forces are enough to overcome the biasing forces of the clutch return spring 26 and provide the required frictional force thereby causing the clutch armature 30, the rotor shaft 16, the rotor 12 and bearings 24 and 20 to be moved as a single unit along the axis.

The clutch rotor 40 is rotational mounted so as to allow for relatively little axial movement to thereby maintain engagement with the activated clutch armature 30. The clutch rotor 40 is directly connected to the turbine load through a shaft 52, which supports the turbine rotor assembly 50. Bearings 44 and 56 are mounted in the turbine housing 51 and a single spring 53 provides the required bearing preload force to retain the turbine rotor assembly 50 and clutch rotor 40 in a relatively fixed axial position.

At rest, the components of the invention are as shown in the drawing wherein the clutch armature engagement surface 36 is separated from the stator 43 by an air gap of approximately 0.015–0.020 inches (0.381–0.508 mm). The engagement surface 36 of the clutch armature 30 is separated from the engagement surface 46 of the clutch rotor 40 by an air gap of approximately 0.010 inches (0.254 mm).

The clutch permits engagement and acceleration of the turbine alternator system to operating speed by use of the electric starter motor, which is subsequently disengaged after reading the required speed (approximately 80,000 rpm).

Engagement consists of activating the clutch field coil assembly 42 by energizing the coil from a power supply connected to lead lines $L_3$ and $L_4$. The entire rotor shaft and clutch armature 30 assembly axially slides so that the engagement surface 36 of the clutch armature 30 frictionally engages the clutch rotor engagement surface 46 of the clutch rotor 40. The starter motor is then energized through lead lines $L_1$ and $L_2$ to bring the motor rotor prime mover and turbine rotor load up to speed. When the starter motor is no longer needed to keep the turbine rotor at that particular speed, the clutch field coil is deenergized and the clutch return spring 26 causes the clutch armature 30 to disengage the clutch rotor 40. The entire shaft/rotor/clutch piece assembly and bearings are shifted to their normal position so that the starter motor may then be turned off and not have a detrimental effect to the speed of the turbine rotor assembly. The turbine is then maintained at its predetermined running speed by the driving gas supply.

It will be apparent that many modifications and variations may be implemented without departing from the scope of the novel concept of this invention. Therefore, it is intended by the appended claims to cover all such modifications and variations which fall within the true spirit and scope of the invention.

I claim:

1. An electromagnetic clutch assembly for controlling the engagement and disengagement of a rotatable prime mover with a rotatable load wherein said assembly includes:
    a clutch rotor having a frictional engagement surface attached to said load and mounted for axial rotation about a first axis;
    a clutch armature having a frictional engagement surface opposed to said clutch rotor engagement surface rigidly attached to said prime mover and mounted for axial rotation about said first axis;
    electromagnetic means mounted adjacent said clutch rotor and clutch armature to cause engagement of said clutch rotor and clutch armature engagement surfaces and thereby communicate rotational driving forces from said prime mover to said load through said frictional engagement surfaces when energized by an external electrical source; and
    means for mounting said clutch armature and prime mover to move axially as a single unit.

2. A clutch assembly as in claim 1, wherein said mounting means provides that said clutch armature and prime mover are spring biased into an axial position in which said engagement surface of said clutch armature is not engaged with said engagement surface of said clutch rotor when said electromagnetic means is de-energized.

3. A clutch assembly as in claim 2, wherein said prime mover is defined as a rotor element, of a motor having a motor housing, wherein said rotor element has a rotor shaft extending axially therefrom and said clutch armature is formed as a unitary structure of ferrous material rigidly attached to said shaft of said motor rotor.

4. A clutch assembly as in claim 3, wherein said mounting means includes rotational bearings connected to support said rotor shaft, said bearings are slidably mounted in said motor housing and said biasing springs are mounted in said housing to axially bias said bearings.

5. A clutch assembly as in claim 4, wherein said load is a balanced turbine rotor assembly with a turbine housing containing a coaxial turbine shaft and said clutch rotor is a unitary structure rigidly attached to said coaxial turbine shaft.

6. A clutch assembly as in claim 5, wherein said rotor element is utilized to engage said turbine rotor through said clutch assembly and drive it to a rotational speed of approximately 80,000 rpm while said electromagnetic means is energized and subsequently disengaged therefrom when said electromagnetic means is de-energized.

* * * * *